A. A. BORKENHAGEN.
COCKROACH TRAP.
APPLICATION FILED JULY 13, 1910.
1,000,368.
Patented Aug. 15, 1911.
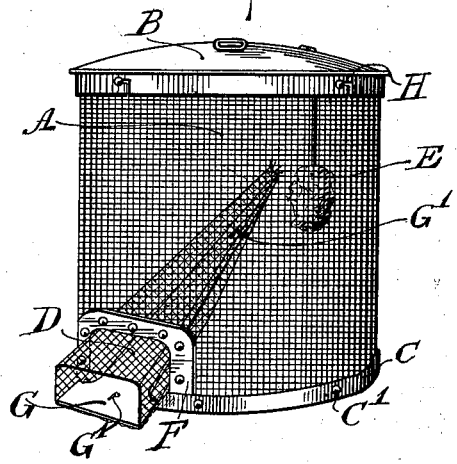
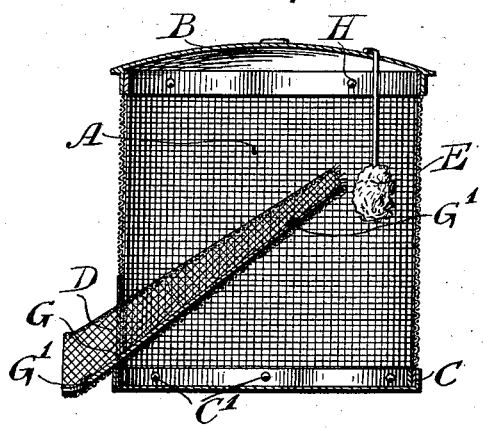

UNITED STATES PATENT OFFICE.

ALBERT A. BORKENHAGEN, OF ST. LOUIS, MISSOURI.

COCKROACH-TRAP.

1,000,368.

Specification of Letters Patent. Patented Aug. 15, 1911.

Application filed July 13, 1910. Serial No. 571,819.

*To all whom it may concern:*

Be it known that I, ALBERT A. BORKENHAGEN, a citizen of the United States, residing at St. Louis, in the State of Missouri, have invented certain new and useful Improvements in Cockroach-Traps, of which the following is a specification.

This invention relates to that class of traps which are used for catching cockroaches and other similar insects.

It is my object to provide a simple, cheap and efficient trap which can be easily emptied, cleaned and baited.

In the drawings, which are to be taken as a part of this specification, I show an embodiment of my invention in a preferred form.

Figure 1 is a perspective of my trap; Fig. 2 is a cross section through the center of Fig. 1.

The body of the trap A is preferably constructed of wire netting, as shown in the illustrations, with metal top B, bottom C and wire-netting inlet D. It may, however, be constructed entirely of metal, or of any other suitable material.

The construction of this trap has many novel features. The entrance D passes through an aperture in the body portion A, so that it can easily be removed. This aperture may be faced with metal F so as to be strong and durable. The large end of the tapered-tube-shaped entrance member D is provided with a broadened portion at the mouth, which gives more room for the insects to enter, and prevents the entrance from rolling or turning. At the small end of the entrance, the rough wires are left pointing inwardly. This makes it impossible for an insect once in the trap to get out. Along the bottom of this entrance, I provide a strip of bait, the entire length. In the drawings, this baiting means is shown as a strip of bait absorbent material G such as felt, fastened in a suitable manner, such as by hooks $G^1$ to either end of the entrance. Any other means of providing a strip of bait may be employed, however. The cover B is also provided with bait, as shown at E. As shown in Fig. 1, the cover is provided with L-shaped slots H, which lock it to the body portion by simply pushing down the cover over the outstanding rivets and slightly rotating. The cover so constructed allows the trap to be carried by the handle without danger of the cover slipping off. The bottom C may or may not be detachable. In the drawings it is shown riveted to the base of the netting by rivets $C^1$.

The advantages my invention has over others are marked. The bait can be renewed by removing the cover and entrance without moving the entire trap. The insect scents the bait much more quickly in this trap than in others, for the bait G extends all along the entrance and is much closer to the insects outside of the trap than in traps heretofore used. The parts being separable can be easily cleaned, and being simple in construction, can be made cheaply and durably. Any part or parts can be replaced without renewing the whole trap. The entrance being wide and comparatively low at the end, is adapted to fit under radiators and in corners where the insects are likely to be.

In operation, the trap is placed with the entrance on the floor, where the cock-roach, or other insect, scents the bait at the mouth. The insect crawls up the entrance scenting first the bait under foot, and then that suspended at E, crawling toward this latter bait, he falls into the trap. No resetting or new bait is required, for the next insect. The trap is always in working order.

It is to be understood that changes may be made in this trap without departing from the spirit of my invention. The entrance may be made round, square, triangular-shaped, or any convenient shape in cross section; and one or more entrances may be used. In the drawings I have shown a sponge or other absorbent material that may be saturated with liquid bait suspended at E. This baiting means may be suspended by a wire from the cover, and in small traps is preferably hung slightly to one side, so that the insect could not possibly reach the bait from the end of the tube. In the drawings, it is shown hung to one side.

Having described my invention, what I claim as new and desire to secure by Letters Patent is:

1. In a cock-roach trap, the combination of a body portion A, cover B, and detachably fitted entrance member D, provided with baiting means G, longitudinally of the member, substantially as and for the purpose described.

2. In combination with a cock-roach trap, one or more tapered-tube-shaped entrance members provided with baiting means throughout their length.

In testimony whereof I affix my signature, in presence of two witnesses.

ALBERT A. BORKENHAGEN.

Witnesses:
 LULU SCHMIDT,
 LOUIS H. HOLTMAN.

---

Copies of this patent may be obtained for five cents each, by addressing the "Commissioner of Patents, Washington, D. C."